(12) United States Patent
Farjadrad et al.

(10) Patent No.: US 12,248,419 B1
(45) Date of Patent: Mar. 11, 2025

(54) INTERFACE CONVERSION CIRCUITRY FOR UNIVERSAL CHIPLET INTERCONNECT EXPRESS (UCIe)

(71) Applicant: Eliyan Corporation, Santa Clara, CA (US)

(72) Inventors: Ramin Farjadrad, Los Altos, CA (US); Kevin Donnelly, Santa Cruz, CA (US)

(73) Assignee: Eliyan Corporation, Santa Clara, CA (US)

( * ) Notice: Subject to any disclaimer, the term of this patent is extended or adjusted under 35 U.S.C. 154(b) by 46 days.

(21) Appl. No.: 18/202,851

(22) Filed: May 26, 2023

Related U.S. Application Data

(60) Provisional application No. 63/346,298, filed on May 26, 2022.

(51) Int. Cl.
    *G06F 13/42*     (2006.01)
    *G06F 13/38*     (2006.01)

(52) U.S. Cl.
    CPC ........ *G06F 13/382* (2013.01); *G06F 2213/40* (2013.01)

(58) Field of Classification Search
    CPC ............................ G06F 13/382; G06F 2213/40
    See application file for complete search history.

(56) References Cited

U.S. PATENT DOCUMENTS

| | | | |
|---|---|---|---|
| 4,334,305 A | 6/1982 | Girardi |
| 5,396,581 A | 3/1995 | Mashiko |
| 5,677,569 A | 10/1997 | Choi |
| 5,892,287 A | 4/1999 | Hoffman |
| 5,910,010 A | 6/1999 | Nishizawa |
| 6,031,729 A | 2/2000 | Berkely |
| 6,055,235 A | 4/2000 | Blanc |
| 6,417,737 B1 | 7/2002 | Moloudi |
| 6,690,742 B2 | 2/2004 | Chan |
| 6,721,313 B1 | 4/2004 | Van Duyne |

(Continued)

OTHER PUBLICATIONS

U.S. Appl. No. 16/812,234; Mohsen F. Rad, filed Mar. 6, 2020.

(Continued)

*Primary Examiner* — Cheng Yuan Tseng
(74) *Attorney, Agent, or Firm* — Lance Kreisman; Peninsula Patent Group

(57) ABSTRACT

An integrated circuit (IC) chip includes a Universal Chiplet Interconnect express (UCIe) interface circuit for transferring UCIe signals. The UCIe interface circuit includes a mainband sub-interface for transferring mainband signals and a sideband sub-interface for transferring sideband signals along a first number of sideband signal paths. A bump interface includes a second number of sideband bumps, each of the sideband bumps for coupling to a signal link. The second number of sideband bumps is less than the first number of sideband signal paths. A converter circuit is disposed between the UCIe interface circuit and the bump interface. The converter circuit includes a receiver circuit to receive first sideband data from the sideband sub-interface.

(Continued)

The receiver circuit includes local clock circuitry, oversampling circuitry, and majority detection circuitry to receive oversampled data and to resolve states of sideband data bits based on a majority voting process.

19 Claims, 6 Drawing Sheets

(56) References Cited

U.S. PATENT DOCUMENTS

| | | |
|---|---|---|
| 6,932,618 B1 | 8/2005 | Nelson |
| 7,027,529 B1 | 4/2006 | Ohishi |
| 7,248,890 B1 | 7/2007 | Raghavan |
| 7,269,212 B1 | 9/2007 | Chau |
| 7,477,615 B2 | 1/2009 | Oshita |
| 7,535,958 B2 | 5/2009 | Best |
| 7,701,957 B1 | 4/2010 | Bicknell |
| 7,907,469 B2 | 3/2011 | Sohn et al. |
| 7,978,754 B2 | 7/2011 | Yeung |
| 8,004,330 B1 | 8/2011 | Acimovic |
| 8,024,142 B1 | 9/2011 | Gagnon |
| 8,121,541 B2 | 2/2012 | Rofougaran |
| 8,176,238 B2 | 5/2012 | Yu et al. |
| 8,483,579 B2 | 7/2013 | Fukuda |
| 8,546,955 B1 | 10/2013 | Wu |
| 8,704,364 B2 | 4/2014 | Banijamali et al. |
| 8,861,573 B2 | 10/2014 | Chu |
| 8,948,203 B1 | 2/2015 | Nolan |
| 8,982,905 B2 | 3/2015 | Kamble |
| 9,088,334 B2 | 7/2015 | Chakraborty |
| 9,106,229 B1 | 8/2015 | Hutton |
| 9,129,935 B1 | 9/2015 | Chandrasekar |
| 9,294,313 B2 | 3/2016 | Prokop |
| 9,349,707 B1 | 5/2016 | Sun |
| 9,379,878 B1 | 6/2016 | Lugthart |
| 9,432,298 B1 | 8/2016 | Smith |
| 9,832,006 B1 | 11/2017 | Bandi |
| 9,842,784 B2 * | 12/2017 | Nasrullah ............ G06F 30/394 |
| 9,886,275 B1 | 2/2018 | Carlson |
| 9,961,812 B2 | 5/2018 | Suorsa |
| 10,171,115 B1 | 1/2019 | Shirinfar |
| 10,402,363 B2 | 9/2019 | Long et al. |
| 10,410,694 B1 | 9/2019 | Arbel |
| 10,439,661 B1 | 10/2019 | Heydari |
| 10,642,767 B1 | 5/2020 | Farjadrad |
| 10,678,738 B2 | 6/2020 | Dai |
| 10,735,176 B1 | 8/2020 | Heydari |
| 10,748,852 B1 | 8/2020 | Sauter |
| 10,803,548 B2 | 10/2020 | Matam et al. |
| 10,804,204 B2 | 10/2020 | Rubin et al. |
| 10,855,498 B1 | 12/2020 | Farjadrad |
| 10,935,593 B2 | 3/2021 | Goyal |
| 11,088,876 B1 | 8/2021 | Farjadrad |
| 11,100,028 B1 | 8/2021 | Subramaniam |
| 11,164,817 B2 | 11/2021 | Rubin et al. |
| 11,204,863 B2 | 12/2021 | Sheffler |
| 11,581,282 B2 * | 2/2023 | Elsherbini ............ H01L 24/16 |
| 11,782,865 B1 | 10/2023 | Kochavi |
| 11,789,649 B2 | 10/2023 | Chatterjee et al. |
| 11,841,815 B1 | 12/2023 | Farjadrad |
| 11,842,986 B1 | 12/2023 | Farjadrad |
| 11,855,043 B1 | 12/2023 | Farjadrad |
| 11,855,056 B1 | 12/2023 | F.Rad |
| 11,892,242 B2 | 2/2024 | Mao |
| 11,893,242 B1 | 2/2024 | Farjadrad |
| 11,983,125 B2 | 5/2024 | Soni |
| 12,001,355 B1 | 6/2024 | Dreier |
| 12,001,725 B2 | 6/2024 | Chatterjee |
| 2002/0122479 A1 | 9/2002 | Agazzi |
| 2002/0136315 A1 | 9/2002 | Chan |
| 2004/0088444 A1 | 5/2004 | Baumer |
| 2004/0113239 A1 | 6/2004 | Prokofiev |
| 2004/0130347 A1 | 7/2004 | Moll |
| 2004/0156461 A1 | 8/2004 | Agazzi |
| 2005/0041683 A1 | 2/2005 | Kizer |
| 2005/0134306 A1 | 6/2005 | Stojanovic |
| 2005/0157781 A1 | 7/2005 | Ho |
| 2005/0205983 A1 | 9/2005 | Origasa |
| 2006/0060376 A1 | 3/2006 | Yoon |
| 2006/0103011 A1 | 5/2006 | Andry |
| 2006/0158229 A1 | 7/2006 | Hsu |
| 2006/0181283 A1 | 8/2006 | Wajcer |
| 2006/0188043 A1 | 8/2006 | Zerbe |
| 2006/0250985 A1 | 11/2006 | Baumer |
| 2006/0251194 A1 | 11/2006 | Bublil |
| 2007/0281643 A1 | 12/2007 | Kawai |
| 2008/0063395 A1 | 3/2008 | Royle |
| 2008/0143422 A1 | 6/2008 | Lalithambika |
| 2008/0186987 A1 | 8/2008 | Baumer |
| 2008/0222407 A1 | 9/2008 | Carpenter |
| 2009/0113158 A1 | 4/2009 | Schnell |
| 2009/0154365 A1 | 6/2009 | Diab |
| 2009/0174448 A1 | 7/2009 | Zabinski |
| 2009/0220240 A1 | 9/2009 | Abhari |
| 2009/0225900 A1 | 9/2009 | Yamaguchi |
| 2009/0304054 A1 | 12/2009 | Tonietto |
| 2010/0177841 A1 | 7/2010 | Yoon |
| 2010/0197231 A1 | 8/2010 | Kenington |
| 2010/0294547 A1 | 11/2010 | Hatanaka |
| 2011/0029803 A1 | 2/2011 | Redman-White |
| 2011/0038286 A1 | 2/2011 | Ta |
| 2011/0167297 A1 | 7/2011 | Su |
| 2011/0187430 A1 | 8/2011 | Tang |
| 2011/0204428 A1 | 8/2011 | Erickson |
| 2011/0267073 A1 | 11/2011 | Chengson |
| 2011/0293041 A1 | 12/2011 | Luo |
| 2012/0082194 A1 | 4/2012 | Tam |
| 2012/0182776 A1 | 7/2012 | Best |
| 2012/0192023 A1 | 7/2012 | Lee |
| 2012/0216084 A1 | 8/2012 | Chun |
| 2012/0327818 A1 | 12/2012 | Takatori |
| 2013/0181257 A1 | 7/2013 | Ngai |
| 2013/0222026 A1 | 8/2013 | Havens |
| 2013/0249290 A1 | 9/2013 | Buonpane |
| 2013/0285584 A1 | 10/2013 | Kim |
| 2014/0016524 A1 | 1/2014 | Choi |
| 2014/0048947 A1 | 2/2014 | Lee |
| 2014/0126613 A1 | 5/2014 | Zhang |
| 2014/0192583 A1 | 7/2014 | Rajan |
| 2014/0269860 A1 | 9/2014 | Brown |
| 2014/0269983 A1 | 9/2014 | Baeckler |
| 2015/0012677 A1 | 1/2015 | Nagarajan |
| 2015/0172040 A1 | 6/2015 | Pelekhaty |
| 2015/0180760 A1 | 6/2015 | Rickard |
| 2015/0206867 A1 | 7/2015 | Lim |
| 2015/0271074 A1 | 9/2015 | Hirth |
| 2015/0326348 A1 | 11/2015 | Shen |
| 2015/0358005 A1 | 12/2015 | Chen |
| 2016/0056125 A1 | 2/2016 | Pan |
| 2016/0071818 A1 | 3/2016 | Wang |
| 2016/0111406 A1 | 4/2016 | Mak |
| 2016/0217872 A1 | 7/2016 | Hossain |
| 2016/0294585 A1 | 10/2016 | Rahman |
| 2017/0286340 A1 | 10/2017 | Ngo |
| 2017/0317859 A1 | 11/2017 | Hormati |
| 2017/0331651 A1 | 11/2017 | Suzuki |
| 2018/0010329 A1 | 1/2018 | Golding, Jr. |
| 2018/0082981 A1 | 3/2018 | Gowda |
| 2018/0175001 A1 | 6/2018 | Pyo |
| 2018/0190635 A1 | 7/2018 | Choi |
| 2018/0196767 A1 | 7/2018 | Linstadt |
| 2018/0210830 A1 | 7/2018 | Malladi et al. |
| 2018/0315735 A1 | 11/2018 | Delacruz |
| 2019/0044764 A1 | 2/2019 | Hollis |
| 2019/0058457 A1 | 2/2019 | Ran |
| 2019/0108111 A1 | 4/2019 | Levin |
| 2019/0198489 A1 | 6/2019 | Kim |
| 2019/0267062 A1 | 8/2019 | Tan |
| 2019/0319626 A1 | 10/2019 | Dabral |
| 2020/0051961 A1 | 2/2020 | Rickard |
| 2020/0105718 A1 | 4/2020 | Collins et al. |
| 2020/0257619 A1 | 8/2020 | Sheffler |
| 2020/0320026 A1 | 10/2020 | Kabiry |

(56) References Cited

U.S. PATENT DOCUMENTS

| | | |
|---|---|---|
| 2020/0364142 A1 | 11/2020 | Lin |
| 2020/0373286 A1 | 11/2020 | Dennis |
| 2021/0056058 A1 | 2/2021 | Lee |
| 2021/0082875 A1 | 3/2021 | Nelson |
| 2021/0117102 A1 | 4/2021 | Grenier |
| 2021/0181974 A1 | 6/2021 | Ghosh |
| 2021/0183842 A1 | 6/2021 | Fay |
| 2021/0193567 A1 | 6/2021 | Cheah et al. |
| 2021/0225827 A1 | 7/2021 | Lanka |
| 2021/0258078 A1 | 8/2021 | Meade |
| 2021/0311900 A1 | 10/2021 | Malladi |
| 2021/0365203 A1 | 11/2021 | O |
| 2021/0405919 A1 | 12/2021 | K |
| 2022/0051989 A1 | 2/2022 | Agarwal |
| 2022/0159860 A1 | 5/2022 | Winzer |
| 2022/0222198 A1* | 7/2022 | Lanka .............. H01L 23/5383 |
| 2022/0223522 A1 | 7/2022 | Scearce |
| 2022/0237138 A1* | 7/2022 | Lanka .............. G06F 13/4027 |
| 2022/0334995 A1* | 10/2022 | Das Sharma ....... G06F 13/4221 |
| 2022/0350756 A1 | 11/2022 | Burstein |
| 2022/0391114 A1 | 12/2022 | Richter |
| 2023/0039033 A1 | 2/2023 | Zarkovsky |
| 2023/0068802 A1 | 3/2023 | Wang |
| 2023/0090061 A1 | 3/2023 | Zarkovsky |
| 2023/0181599 A1 | 5/2023 | Erickson |
| 2023/0289311 A1 | 9/2023 | Noguera Serra |
| 2024/0007234 A1 | 1/2024 | Harrington |
| 2024/0028208 A1 | 1/2024 | Kim |
| 2024/0241840 A1 | 7/2024 | Im |
| 2024/0273041 A1* | 8/2024 | Lee .............. G06F 13/20 |

OTHER PUBLICATIONS

Farjadrad et al., "A Bunch of Wires (B0W) Interface for Inter-Chiplet Communication", 2019 IEEE Symposium on High-Performance Interconnects (HOTI), pp. 27-30, Oct. 2019.

Universal Chiplet Interconnect Express (UCIe) Specification Rev. 1.0, Feb. 24, 2022.

"Hot Chips 2017: Intel Deep Dives Into EMIB", TomsHardware. com; Aug. 25, 2017.

"Using Chiplet Encapsulation Technology to Achieve Processing-In-Memory Functions"; Micromachines 2022, 13, 1790; https://www.mdpi.com/journal/micromachines; Tian et al.

"Multiport memory for high-speed interprocessor communication in MultiCom;" Scientia Iranica, vol. 8, No. 4, pp. 322-331; Sharif University of Technology, Oct. 2001; Asgari et al.

Block Memory Generator v8.2 LogiCORE IP Product Guide Vivado Design Suite; Xilinx; Apr. 1, 2015.

Kurt Lender et al., "Questions from the Compute Express Link Exploring Coherent Memory and Innovative Cases Webinar", Apr. 13, 2020, CXL consortium.

Planet Analog, "The basics of SerDes (serializers/deserializers) for interfacing", Dec. 1, 2020, Planet Analog.

Universal Chiplet Interconnect Express (UCIe) Specification, Revision 1.1, Version 1.0, Jul. 10, 2023.

Hybrid Memory Cube Specification 2.1, Hybrid Memory Cube Consortium, HMC-30G-VSR PHY, 2014.

* cited by examiner

INTERFACE CONVERSION CIRCUITRY FOR UNIVERSAL CHIPLET INTERCONNECT EXPRESS (UCIe)

CROSS-REFERENCE TO RELATED APPLICATIONS

This application is a Non-Provisional that claims priority to U.S. Provisional Application No. 63/346,298, filed May 26, 2022, entitled IMPROVEMENTS & OPTIMIZATIONS TO UNIVERSAL CHIPLET INTERCONNECT EXPRESS (UCIE), which is incorporated herein by reference in its entirety.

TECHNICAL FIELD

The disclosure herein relates to semiconductor devices, packaging and associated methods.

BACKGROUND

As integrated circuit (IC) chips such as system on chips (SoCs) become larger, the yields realized in manufacturing the chips become smaller. Decreasing yields for larger chips increases overall costs for chip manufacturers. To address the yield problem and also reduce costs, chiplet architectures have been proposed that favor a modular approach to SoCs. The solution employs smaller sub-processing chips, each containing a well-defined subset of functionality. Chiplets thus allow for dividing a complex design, such as a high-end processor or networking chip, into several small die instead of one large monolithic die.

In an effort to standardize die-to-die chiplet interfaces, a Universal Chiplet Interconnect express (UCIe) interface has been proposed. The interface generally provides a common die-to-die interconnect for chiplets that standardizes inter-die communication on-package. While beneficial in specifying a common die-to-die on-package interface, the existing standard leaves room for improvement in various areas.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Semiconductor devices, packaging architectures and associated methods are disclosed. In one embodiment, an integrated circuit (IC) chip is disclosed. The IC chip includes a mainband sub-interface for transferring mainband signals and a sideband sub-interface for transferring sideband signals along a first number of sideband signal paths. A bump interface includes a second number of sideband bumps, each of the sideband bumps for coupling to a signal link. The second number of sideband bumps is less than the first number of sideband signal paths. A converter circuit is disposed between the UCIe interface circuit and the bump interface. The converter circuit includes a receiver circuit to receive first sideband data from the sideband sub-interface. The receiver circuit includes local clock circuitry, oversampling circuitry, and majority detection circuitry to receive oversampled data and to resolve states of sideband data bits based on a majority voting process. By employing the local clock circuitry, oversampling circuitry, and majority detection circuitry in the receiver circuit, a reduction in the number of sideband links may be achieved which correspondingly reduces the number of bumps required for the bump interface.

Figure 1:
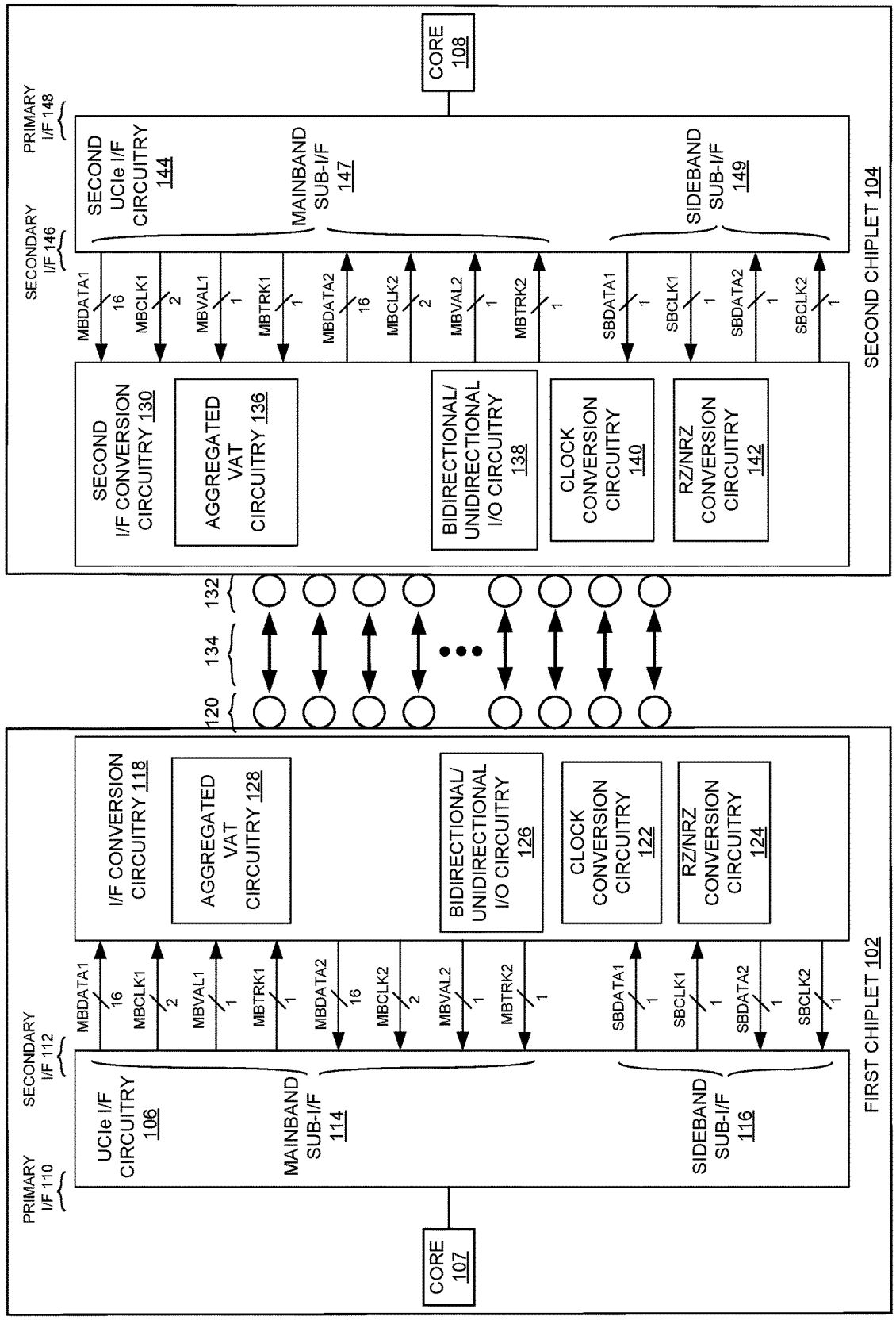
FIG. 1 illustrates a high-level embodiment of a multi-chip module (MCM), including a first integrated circuit (IC) chiplet in communication with a second IC chiplet.

Throughout the disclosure provided herein, the term multi-chip module (MCM) is used to represent a semiconductor device that incorporates multiple semiconductor die or sub-packages in a single unitary package. An MCM may also be referred to as a system in a package (SiP). With reference to FIG. 1, a block diagram of one embodiment of a multi-chip module (MCM) is shown, generally designated 100. For one embodiment, the MCM includes a package substrate (not shown) that forms a support surface for multiple integrated circuit (IC) chips, or chiplets, including a first IC chiplet 102 and a second IC chiplet 104. For some applications, the package substrate takes the form of a low-cost non-silicon substrate.

With continued reference to FIG. 1, for one embodiment the first IC chiplet 102 includes first Universal Chiplet Interconnect express (UCIe) interface circuitry 106. The first UCIe interface circuitry 106 provides a standardized communications interface that generally allows first core circuitry 107 of the first IC chiplet 102 to communicate with second core circuitry 108 of the second IC chiplet 104 via the common UCIe interface. To achieve this general goal, the first UCIe interface circuitry 106 employs a primary interface 110 for coupling to the first core circuitry 107 of the first IC chiplet 102, and a secondary interface 112 that transfers (transmits and receives) signals in accordance with a UCIe protocol.

Further referring to FIG. 1, the secondary interface 112 of the first UCIe interface circuitry 106 includes a mainband sub-interface 114 for mainband signaling and a sideband sub-interface 116 for sideband signaling. In general, the sideband sub-interface 116 operates at a relatively low signaling rate while the mainband sub-interface 114 operates at a much higher signaling rate, such as an integer multiple of the low signaling rate. The sideband sub-interface 116 includes respective first and second unidirectional sideband data paths SBDATA1 and SBDATA2 that are each accompanied by respective unidirectional sideband clocks SBCLK1 and SBCLK2. The mainband sub-interface 114 includes one or more clusters of unidirectional transmit and receive data signal paths, MBDATA1 and MBDATA2, along with support signal paths in the form of clock paths MBCLK1 and MBCLK2, valid signal paths MBVAL1 and MBVAL2, and track signal paths MBTRK1 and MBTRK2.

For legacy situations involving direct UCIe-to-UCIe connections between chiplets, a given legacy chiplet generally employs a number of interface bumps that corresponds to the number of signal paths employed by the UCIe interface.

With the UCIe standard specifying forty-four signaling paths for a two-cluster interface configuration, a legacy chiplet bump interface would interconnect to forty-four interface bumps that are formed on a mounting surface of a given IC chiplet. With surface area and overall footprint constraints, each bump on a given IC chiplet takes up valuable surface area. In many situations, reducing the number of links and corresponding bumps may provide significant improvements in bandwidth density for die-to-die connectivity with corresponding reductions in cost.

Further referring to FIG. 1, to reduce a number of bumps associated with the sideband sub-interface 116, one embodiment of the first chiplet 102 employs interface conversion circuitry 118 that is situated between the UCIe interface circuitry 106 and a reduced bump interface 120. The interface conversion circuitry 118 includes a suite of optional transmit-side and receive-side conversion circuits that may be employed separately or in various combinations to reduce the number of bumps in the reduced bump interface 120 to a number that is less than the number of signal paths of the UCIe interface circuitry 106. For some embodiments, a reduction in sideband-related bumps may be realized through use of clock conversion circuitry 122 that reduces the number of sideband clock bumps, and provides various clocking functions described more fully below. For certain embodiments, a Non-Return-to-Zero (NRZ) to Return-to-Zero (RZ) converter circuit 124 may be employed to completely eliminate any sideband clocks. Other embodiments may employ Unidirectional-to-Simultaneous-Bidirectional input/output (I/O) circuitry 126 to further reduce the sideband or mainband data bumps. In one embodiment, the interface conversion circuitry 118 includes aggregated valid-and-track (VAT) circuitry 128 to reduce the number of signals associated with the UCIe valid and track signals. Further details pertaining to each of the conversion circuits of the interface conversion circuitry 118 are described below.

With continued reference to FIG. 1, for one embodiment the second IC chiplet 104 is formed similar to the first IC chiplet 102, with second interface conversion circuitry 130 coupled to the first interface conversion circuitry 106 of the first IC chiplet 102 via a second bump interface 132 that connects to the first bump interface 120 via multiple links 134. For one embodiment, the second interface conversion circuitry 130 includes the same suite of conversion circuits employed by the first interface conversion circuitry 118, including second aggregated VAT circuitry 136, second Bidirectional/Unidirectional I/O circuitry 138, second clock conversion circuitry 140, and second RZ/NRZ conversion circuitry 142. Second UCIe interface circuitry 144 includes a secondary interface 146 that couples to the second interface conversion circuitry 130, and includes a second mainband sub-interface 147 and a second sideband sub-interface 149. A second primary interface 148 couples to the second core circuitry 108 of the second IC chiplet 104.

Figure 2:
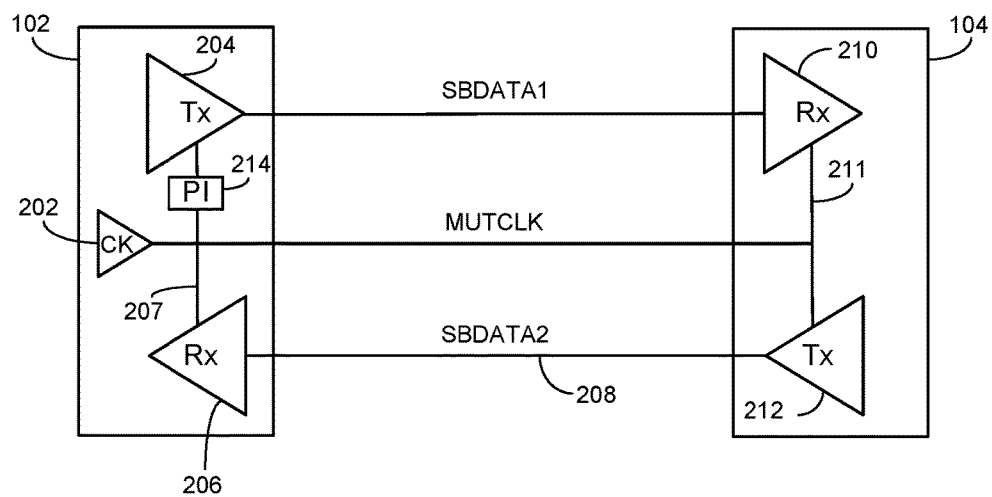
FIG. 2 illustrates one embodiment of a converted UCIe sideband interface for use in the MCM of FIG. 1.

FIG. 2 illustrates one embodiment of an architectural view of the first and second IC chiplets 102 and 104 showing only UCIe-related post-converted sideband signaling paths and associated links. As explained above for the architecture of FIG. 1, the UCIe interface standard specifies four signal paths for sideband controls. The specific signal paths break down to two unidirectional data signal paths and two unidirectional clock signal paths. To eliminate one of the sideband lock signal paths, one embodiment of the interface conversion circuitry 118 employs the clock conversion circuitry 122 to generate a shared or mutual sideband clock MUTCLK that is used by both IC chiplets 102 and 104 for transmit and receive operations.

Further referring to FIG. 2, for one embodiment, the first IC chiplet 102 is configured as a master chiplet that controls the timing of the second IC chiplet 104, which is configured as a minion chiplet. The clock conversion circuitry 122 of the master chiplet 102 includes a single clock generator 202 to generate the mutual clock signal MUTCLK that is based on the UCIe sideband clock signal SBCLK1. The mutual clock signal MUTCLK is fed to a first sideband data transmitter 204 to clock the transmission of first sideband data SBDATA1 from the master chiplet 102 to the minion chiplet 104, and to a first sideband data receiver 206, along a first timing path 207, to sample second sideband data SBDATA2 sent by the minion chiplet 104 to the master chiplet 102. The mutual clock signal MUTCLK is also forwarded to the minion chiplet 104 via a sideband clock path 208. The minion chiplet 104 receives the mutual sideband clock signal MUTCLK and routes the mutual sideband clock signal MUTCLK as a sampling signal to a second sideband data receiver 210, and as a transmit timing signal along a second timing path 211 to a second sideband transmitter 212.

With continued reference to FIG. 2, at low data speeds, the first sideband receiver 206 of the master chiplet 102 may use the mutual sideband clock signal MUTCLK directly to sample the received second sideband data SBDATA2 from the minion chiplet 104. However, in some circumstances the data rate may be high enough such that a notable timing offset may develop between the mutual sideband clock MUTCLK and the second sideband data SBDATA2 due to the time-of-flight incurred by the mutual sideband clock signal propagating from the master chiplet 102 to the minion chiplet 104, and the second sideband data SBDATA2 propagating from the minion chiplet 104 to the master chiplet 102 (causing a clock round-trip delay). For such high data rate environments, a phase interpolator 214 may be employed along the first timing path 207 between the first sideband data transmitter 204 and the sampling input of the first sideband receiver 206 to align the mutual sideband clock sampling phase with the received second sideband data SBDATA2 from the minion chiplet 104.

For the embodiment shown in FIG. 2, by converting the UCIe sideband clock signaling circuitry from two unidirectional sideband clock signals to a single mutual sideband clock signal MUTCLK, the interface conversion circuitry 118 reduces the number of sideband clock paths to one path. A corresponding reduction in the number of bumps improves the bandwidth density of the bump array 120.

Figure 3:
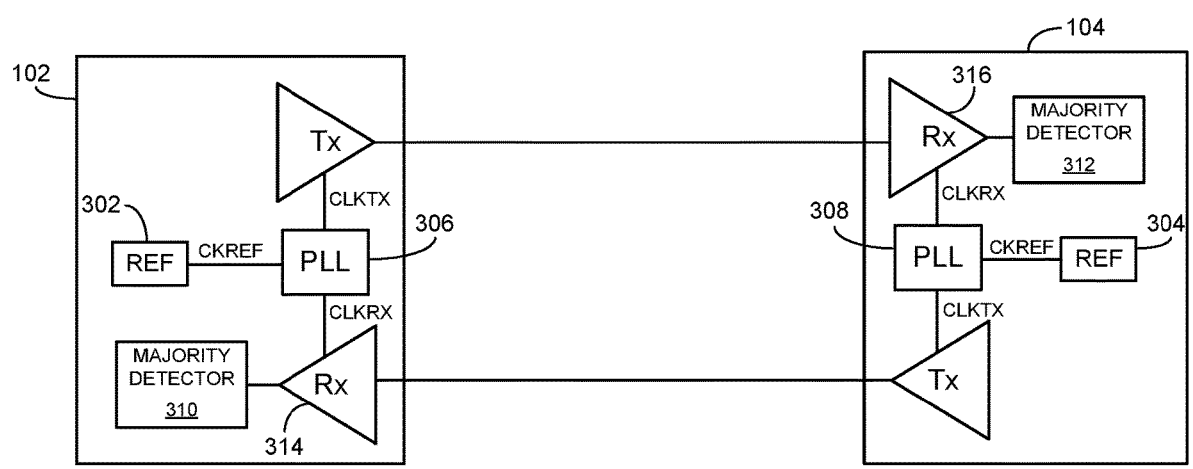
FIG. 3 illustrates a further embodiment of a converted UCIe sideband interface for use in the MCM of FIG. 1.

FIG. 3 illustrates a further embodiment similar to FIG. 2, showing an architectural view of the first and second IC chiplets 102 and 104 with only UCIe-related post-converted sideband signaling paths and associated links. For one embodiment, the clock conversion circuitry 122 and 140 for each IC chiplet 102 and 104 includes respective reference clock generators 302 and 304 to generate a reference clock CKREF of a common frequency, such as 100 MHz. Respective locked loop circuits, such as phase-locked loops 306 and 308 are employed in each chiplet 102 and 104 to generate respective transmit and receive clock signals CLKTX and CLKRX based on the common reference clock signal CKREF. For one embodiment, the receive clock frequency is an integer multiple of the transmit clock frequency to allow for oversampling of received sideband data from the other chiplet. One specific example may generate a transmit clock frequency of 400 MHZ, and a receive clock frequency of 4 GHz. Respective majority detector circuits 310 and 312 are disposed at the output of respective chiplet receivers 314 and 316 to resolve data bit values of the received sideband data via a majority voting technique. Since the timing signals for transmitting the sideband data and sampling the received sideband data are generated locally by each chiplet 102 and 104, there is no need to forward any clock signals along clock paths between the chiplets 102 and 104. As a result, the UCIe specified sideband clock signals may be converted to local clock signals on each chiplet 102 and 104, and not forwarded between the chiplets 102 and 104. This reduces the number of clock paths for the sideband sub-interfaces 116 and 149 to zero.

Figure 4:
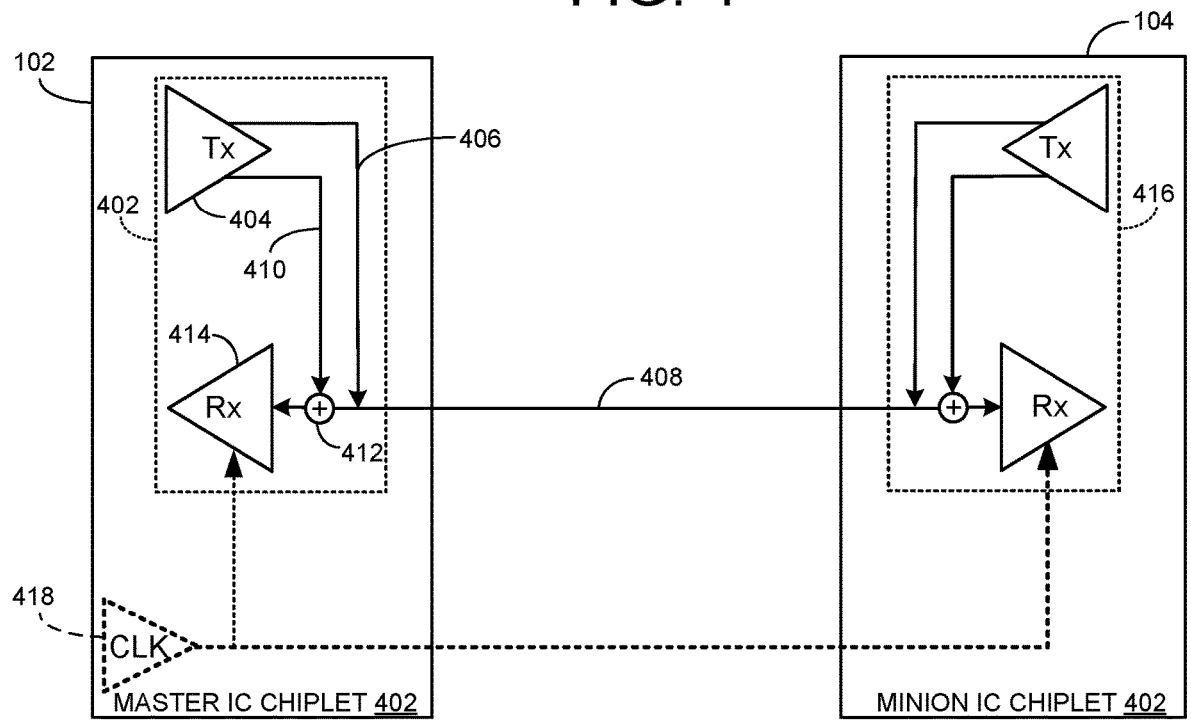
FIG. 4 illustrates another embodiment of a converted UCIe sideband interface for use in the MCM of FIG. 1.

The embodiments of FIGS. 2 and 3 above address ways to reduce clock signaling paths between chiplets to improve the bandwidth density of each of the chiplet bump interfaces 120 and 132. Further reductions in signal paths may be achieved with respect to the UCIe sideband data paths. FIG. 4 illustrates such an embodiment through use of a simultaneous bidirectional signaling technique to communicate the sideband data.

Further referring to FIG. 4, the first IC chiplet 102 includes a first simultaneous bidirectional input/output (I/O) circuit 402 that includes transmit circuitry 404 that transmits first sideband data along a first transmit path 406 to a link 408, and complement data along a complement path 410 to a summer 412. Receiver circuitry 414 receives second sideband data sent from a second simultaneous bidirectional I/O circuit 416 of the second IC chiplet 104 that has been summed with the complement data sent by the transmit circuitry 404, essentially cancelling any reflected first (transmit) data signals that may be included in the second (receive) data. The second simultaneous bidirectional I/O circuit 416 also includes transmit and receive circuitry similar to that of the local I/O circuitry. By transmitting and receiving first sideband data and second sideband data concurrently over the single link 408, the use of two separate unidirectional signaling paths specified by the UCIe interface standard may be converted and reduced to a single path, reducing the sideband data sub-interface by one path.

Further referring to FIG. 4, for one embodiment, the clock conversion circuitry 122 and 140 of the first and second interface conversion circuitry 118 and 130 may generate and distribute a single clock signal, such as at 418 (in phantom) similar to that described in the sideband clocking architecture of FIG. 2, or by using the clockless majority detection clocking scheme of FIG. 3. A further embodiment to synchronize the timing between the first and second chiplets for the simultaneous bidirectional data paths involves converting the UCIe data signaling protocol from a Non-Return-to-Zero (NRZ) signaling protocol to a Return-to-Zero signaling protocol.

Figure 5:
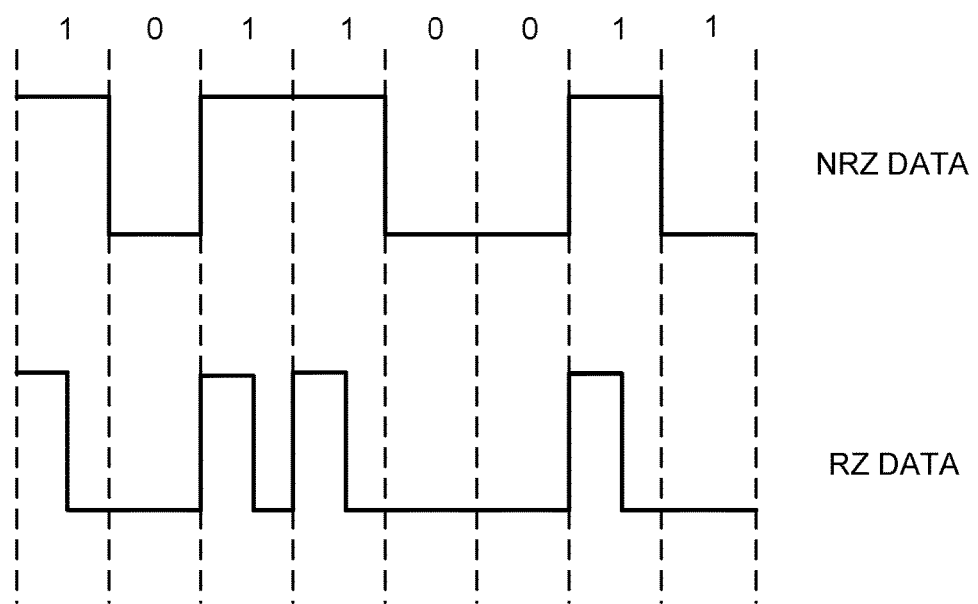
FIG. 5 illustrates equivalent NRZ and RZ waveforms for a given sequence of data bits.

FIG. 5 illustrates a sequence of data bit values 10110011 in both an NRZ data format and an RZ data format. RZ-formatted data carries timing information within the signal itself, eliminating the need for a clock signal to accompany the data on a separate clock signal path. The use of RZ-formatted data also allows for extraction of the timing information without the need for a fully featured clock data recovery (CDR) circuit, which may be preferred in some embodiments. Use of the NRZ-to-RZ converter circuits 124 and 142 (FIG. 1) converts the UCIe NRZ data to an RZ format, and vice-versa, ensuring that when there is no data (or idle data), the data path will stay at a logic 0 level all of the time (or a logic 1), and only when there is real data (logic 1 or logic 0) to be transmitted between chiplets will there be a transition that triggers the receiver to start sampling.

While the embodiments described above relate to reducing UCIe signal paths associated with the UCIe sideband sub-interfaces 116 and 149, additional signal path reductions may be achieved through further techniques applied to the mainband sub-interfaces 114 and 147, as described below with respect to FIGS. 6-10. The UCIe valid signals MBVAL1 and MBVAL2 are generally aligned with the mainband data signals MBDATA1 and MBDATA2 and are employed to indicate where data frames for a given cluster of data paths begin/end and provide power management information during clock-gating modes of operation. The UCIe track signals MBTRK1 and MBTRK2 are used to provide phase alignment updates for clock tracking on a receive side of a data transfer for a given UCIe data cluster. For one specific embodiment, shown in FIG. 6, the UCIe valid signal path, such as MBVAL1, and the track signal path MBTRK1, associated with a first mainband data cluster, may be combined into one path, resulting in a mainband signal path reduction of one path for each data cluster. When utilized with a simultaneous bidirectional signaling I/O architecture, such as that shown in FIG. 4, the number of paths associated with the valid and track signal paths may be further reduced.

Figure 6:
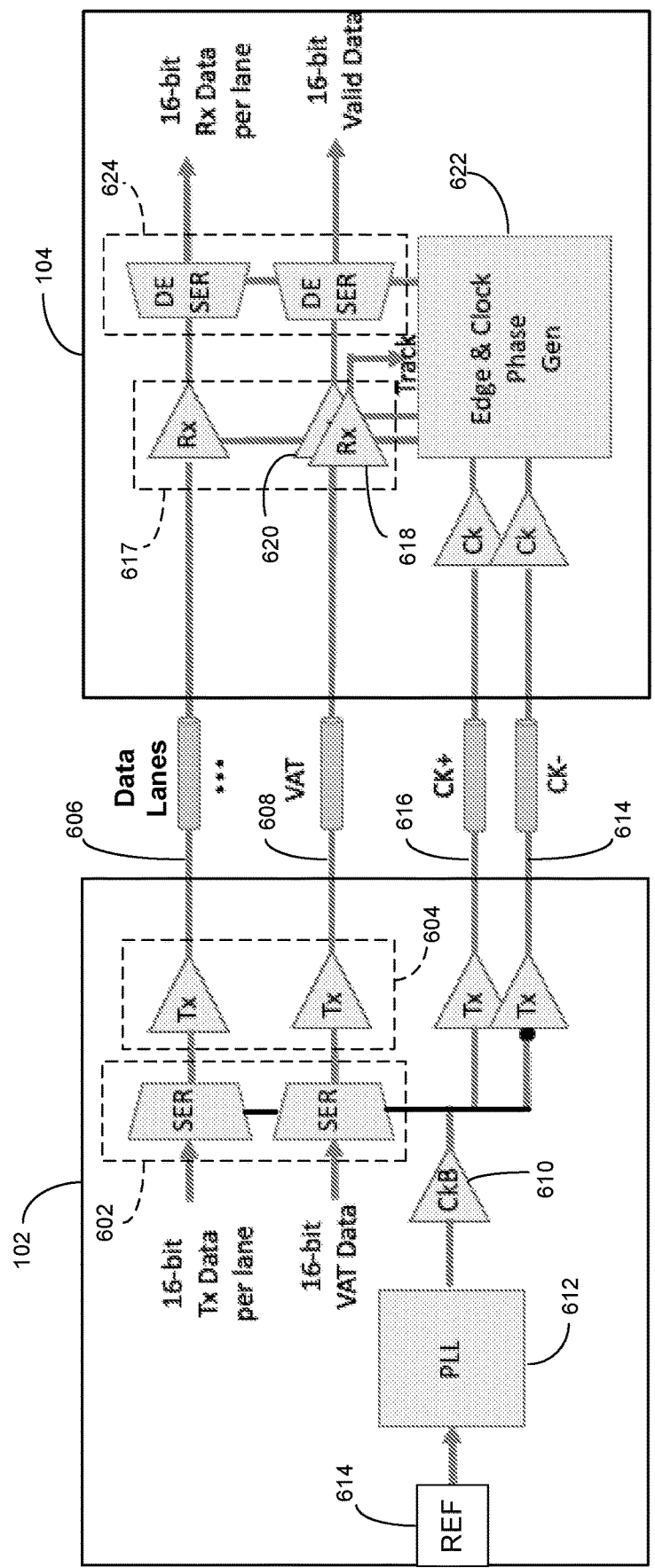
FIG. 6 illustrates one embodiment of a converted UCIe mainband interface for use in the MCM of FIG. 1.

Further referring to FIG. 6, an architectural view of the first and second IC chiplets 102 and 104 is shown that includes only UCIe-related post-converted mainband signaling paths and associated links in a single direction. The interface conversion circuitry 118 of the first IC chiplet 102 employs the aggregated VAT circuitry 128 (FIG. 1) to, for each data cluster, combine the 16-bit valid signal, such as MBVAL1 with the track signal, such as MBTRK1. To carry out transmission of mainband data, the interface conversion circuitry 118 includes serialization circuitry 602 that serializes parallel mainband data to serial data and for transmission by transmit circuitry 604 along one or more clusters of data lanes 606. The serialization circuitry 602 also serializes 16-bit valid/track data to a single 16-bit stream for transmission along a single VAT link 608. The clock conversion circuitry 122 (FIG. 1) of the first IC chiplet 102 includes a clock generator 610 that generates a high-speed mainband clock CKB via a phase-locked loop 612 based on a reference clock signal REF generated by a reference clock source 614. For one embodiment, the high-speed mainband clock signal CKB is fed to the serialization circuitry 602 to time the serialization of the mainband data and VAT signals, and transferred as a differential clock along a pair of clock paths 614 and 616.

Further referring to FIG. 6, the second IC chiplet 104 receives the mainband data, VAT and clock signals in a manner that allows the single VAT signal propagated along path 608 to provide 1) framing information for the mainband data, 2) clock gating functionality during certain modes of operation, and 3) clock tracking information. For one embodiment, the second IC chiplet 104 employs mainband receiver circuitry 617 for the VAT signal stream that includes an edge sampling circuit 618 and a data sampling circuit 620. Respective edge and data timing signals for the edge sampling circuit 618 and the data sampling circuit 620 are generated by an edge and clock phase generator 622. The edge and clock phase generator 622 generates the edge and data timing signals based on the received mainband differential clock signal components CK+ and CK−. For one embodiment, the data timing signal is generated to be ninety degrees out of phase with the VAT signal to be sampled. The sampled VAT bits are then fed to deserializer circuitry 624, which converts the VAT bitstream to parallel bits to indicate framing for the received mainband data. The VAT bits are also used for clock gating purposes as more fully explained below. For one embodiment, the edge timing signal is generated to approximate an expected edge placement of the received VAT data bits such that when fed to the edge sampler 618, a sequence of sampled bits are able to detect an edge transition, indicating timing information associated with the received VAT signal, which when fed back to the edge and clock phase generator 622, provides tracking information for phase alignment purposes.

With continued reference to FIG. 6, for purposes of brevity, the circuitry for employing the aggregated VAT signal is described in a unidirectional manner with transmission from the first IC chiplet 102 and reception at the second IC chiplet 104. It is to be understood that an opposite direction of VAT signal transmission and reception is also envisioned, with the second IC chiplet 104 employing similar transmit circuitry 604 as that described for the first IC chiplet 102 and the first IC chiplet 102 employing similar receive circuitry 617 to that described with respect to the second IC chiplet 104. For one embodiment, simultaneous bidirectional links such as that described above with respect to FIG. 4 may be used to accomplish the bidirectional signaling.

Figure 7:
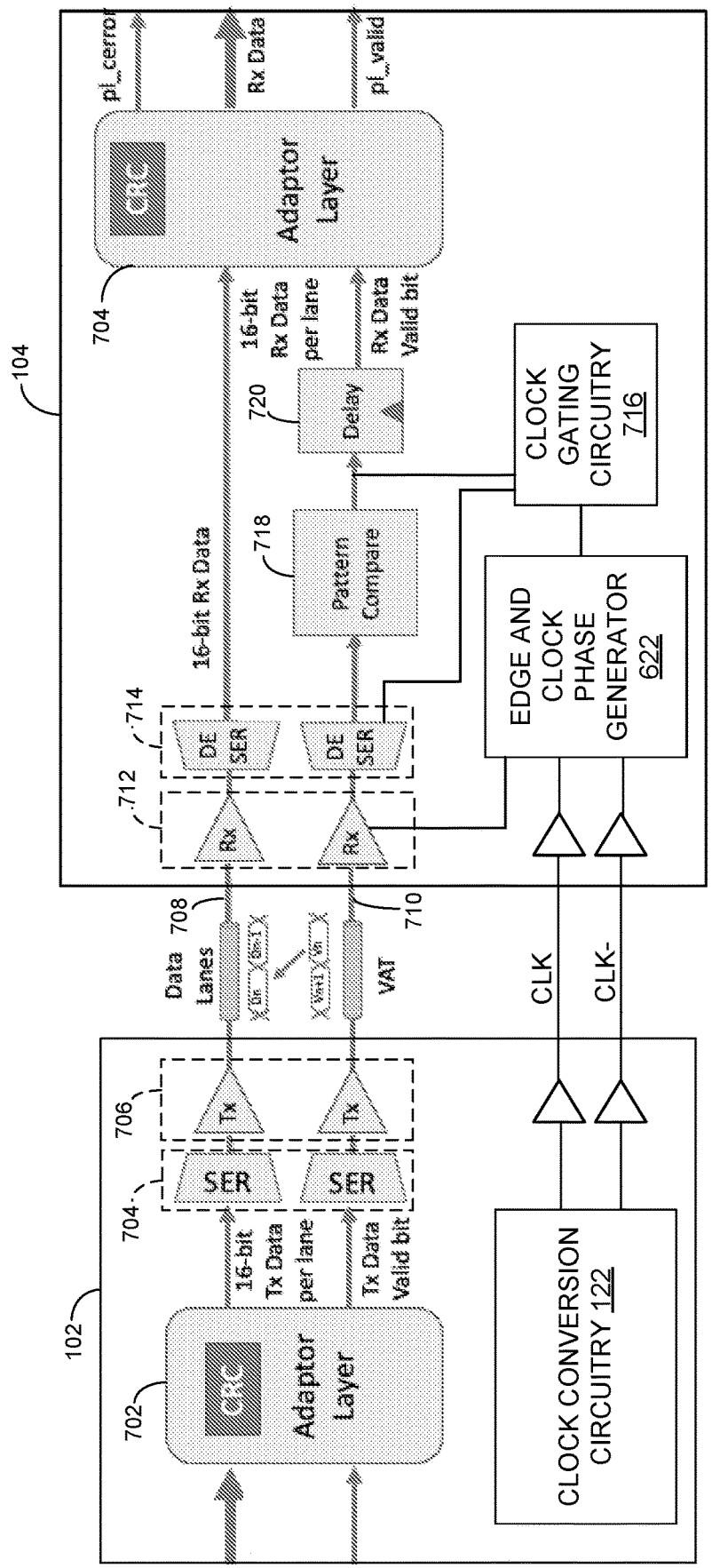
FIG. 7 illustrates a further embodiment of a converted UCIe mainband interface for use in the MCM of FIG. 1.

For some embodiments, the interface conversion circuitry 118 and 130 of FIG. 1 supports at least one low-power or idle mode of operation that is specified by the UCIe standard. Generally, the idle mode of operation reduces power by disabling or otherwise gating timing signal generation during periods where no mainband data is transmitted or received. FIG. 7 illustrates one embodiment of a transmit and receive architecture for the interface conversion circuitry 118 and 130 that is similar to that shown FIG. 1, but including circuitry to utilize the aggregated VAT signal as an indicator of when the link is entering into or exiting from an idle mode of operation.

Further referring to FIG. 7, for one embodiment, the clock conversion circuitry 122 and 140 of the first and second IC chiplets 102 and 104 includes first and second Cyclic Redundancy Check (CRC) circuitry 702 and 704. The first CRC circuitry 702 receives parallel mainband data MBDATA and a valid signal MBVAL and performs CRC error-code processing that results in a phase offset or delay of at least a clock cycle between the mainband data MBDATA and the valid signal MBVAL. The valid signal MBVAL and the mainband data bits MBDATA are then serialized by serializer circuitry 704 and transmitted by transmit circuitry 706, with the offset, along the mainband and VAT links 708 and 710 to receiver circuitry 712 of the second IC chiplet 104.

For one embodiment, the valid data signal MBVAL is coded into a multi-bit pattern of ones and zeros that indicates whether the accompanying data MBDATA is valid, and also includes a sufficient edge density to allow for phase tracking. For one specific embodiment, the VAT multi-bit pattern is realized as a 16-bit sequence that takes the form of 1111_1011_1011_1011 for valid data, and 0000_0100_0100_0100 for invalid data. Other patterns may be utilized that achieve similar results, depending on the application.

Further referring to FIG. 7, as the VAT bits are received by the receiver circuitry 712 of the second IC chiplet 104, and deserialized by deserializer circuitry 714, a copy of the first four bits of the VAT pattern are fed to a clock gating circuit 716 while the full set of parallel VAT bits are provided to a pattern comparison circuit 718. The pattern comparison circuit 718 generally detects whether the VAT bits indicate valid data or non-valid data. In the event that a non-valid data state is detected, then a control signal specifying entry into an idle state is dispatched to the clock gating circuitry 716. The clock gating circuitry 716 then interacts with the edge and clock clock phase generator 622 to disable or otherwise shut down the receiver timing circuitry to reduce power. For one embodiment, the UCIe standard specifies a certain pre-entry window of clock cycles before the chiplets may enter an idle mode. Since the inherent delay caused by the initial CRC processing delays the mainband data MBDATA relative to the VAT bits MBVAL, the pre-entry window (minimum time interval before entry) specified by the UCIe standard is met with little to no further latency.

Further referring to FIG. 7, for one embodiment, the first four bits of the VAT signal that are initially fed to the clock gating circuitry 716 may be used to quickly initiate an exit from the idle mode of operation to the valid data transfer mode of operation. Following the evaluations of the VAT bits described above, a delay circuit 720 disposed in the VAT signal path restores alignment of the VAT signal to the mainband data signal.

Similar to the discussion above with respect to FIGS. 1-6, the circuitry of FIG. 7 is shown in an abbreviated manner, with a single direction of transmission over a given set of links illustrated. For some embodiments, simultaneous bidirectional links may be employed for some or all of the links. Under such circumstances, the transmit circuitry 706 of the first IC chiplet 102 may be duplicated at the second IC chiplet 104, while the receiver circuitry 712 of the second IC chiplet 104 may be duplicated by the first IC chiplet 102.

Figure 8:
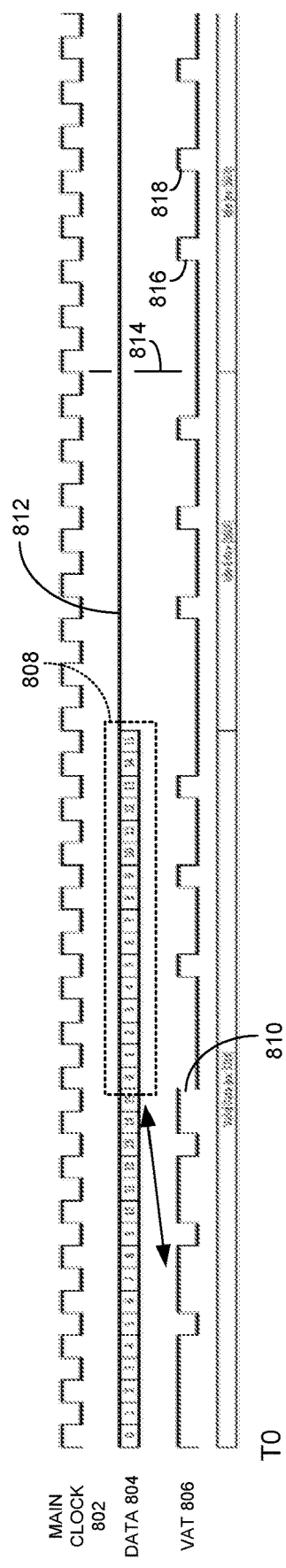
FIGS. 8 and 9 illustrate timing diagrams showing entry and exit to and from an idle mode of operation for the converted UCIe mainband interface of FIG. 7.

FIG. 8 represents a timing chart illustrating one example of the circuitry of FIG. 7 entering into the idle mode of operation, with waveforms shown just prior to deserialization in the receiver circuitry 712 (FIG. 7). The top waveform, at 802, represents a main clock signal. Immediately underneath the main clock waveform is a data bit sequence, at 804, with single bits corresponding to one unit interval (UI) (half a clock cycle of the main clock signal), and word sizes corresponding to sixteen bits. Directly beneath the data bit sequence is a VAT bit sequence 806 that is offset from the mainband data sequence by sixteen UI, or a data word.

Further referring to FIG. 8, at T0, a first sequence of the VAT signal indicates valid data for a mainband data sequence, at 808, which is delayed from the VAT sequence by sixteen UI. At 810, a change in the VAT bit pattern is detected, indicating no valid data, at 812. In accordance with the UCIe standard, entry into the idle mode of operation begins sixteen UI following the last bit of the mainband data, at 814. While operating in the idle mode, periodic edge transitions in the VAT signal, such as at 816 and 818 provide timing information that allows the edge and clock phase generation circuitry 622 to track any phase offsets between clock and data signals.

Figure 9:
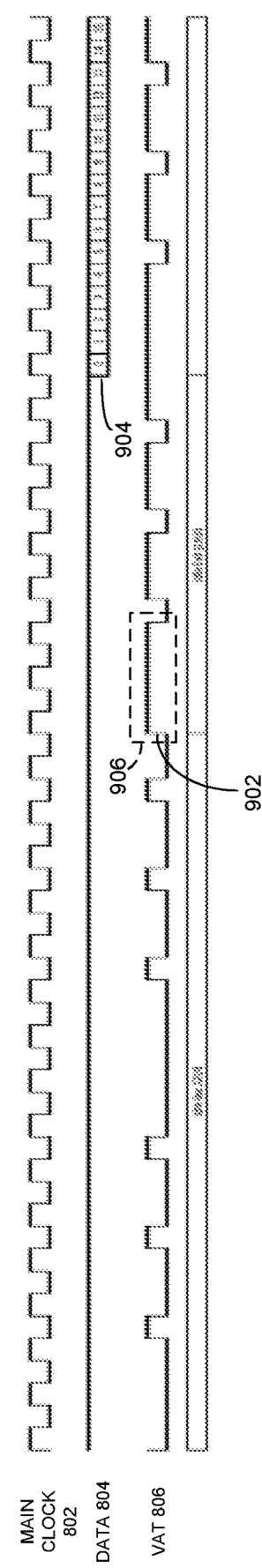

FIG. 9 illustrates a timing chart illustrating one example of the circuitry of FIG. 7 exiting out of the idle mode of operation, with waveforms shown just prior to deserialization in the receiver circuitry 712. At 902, the VAT bit sequence changes from a non-valid data pattern to a valid data pattern, indicating the presence of valid data in sixteen UI, at 904. With the first four bits of the VAT sequence detected, at 906, a quick exit from the idle mode may be initiated by dispatching a control signal to the clock gating circuitry 716 to cease gating the clock signals and to re-start the clock circuitry for generating sampling signals to sample the incoming mainband data.

Those skilled in the art will appreciate that the various embodiments disclosed herein may be utilized separately or in various sub-combinations to reduce the number of bumps on a chiplet that employs a UCIe standardized interface. Reducing the number of bumps enhances bandwidth density for the chiplet packaging interface, resulting in lower costs and improved performance characteristics.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present disclosure. In some instances, the terminology and symbols may imply specific details that are not required to practice aspects of the disclosure. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low level for active-low signals or high logic level for active-hich signals (or discharged to low logic state or charged to a high logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While aspects of the disclosure have been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. An integrated circuit (IC) chip, comprising:
a Universal Chiplet Interconnect express (UCIe) interface circuit to transfer signals in accordance with a UCIe protocol, the UCIe interface circuit comprising
a mainband sub-interfaces to transfer mainband signals, and
a sideband sub-interface to transfer sideband signals along a first number of sideband signal paths;
a bump interface comprising a second number of sideband bumps, each of the second number of sideband bumps to couple to a signal link, wherein the second number of sideband bumps is less than the first number of sideband signal paths; and
a converter circuit disposed between the UCIe interface circuit and the bump interface, the converter circuit comprising
a receiver circuit to receive first sideband data from the sideband sub-interface via the converter circuit, the first sideband data received from off-chip via a first link, the receiver circuit comprising
local clock circuitry to generate a sampling signal;
oversampling circuitry to oversample the first sideband data in response to the sampling signal to generate oversampled data; and
majority detection circuitry to receive the oversampled data and to resolve states of bits of the first sideband data based on a majority voting process carried out by the majority detection circuitry.

2. The IC chip of claim 1, wherein:
the receiver circuit receives the first sideband data from a second IC chip via the first link.

3. The IC chip of claim 2, further comprising:
a locked-loop circuit to generate the sampling signal based on a reference clock, the reference clock common to the IC chip and the second IC chip.

4. The IC chip of claim 2, further comprising:
a sideband transmit circuit to transmit solely second sideband data to the second IC chip without an accompanying sideband clock.

5. The IC chip of claim 4, wherein:
the sideband transmit circuit is configured to transmit the second sideband data along the first link.

6. The IC chip of claim 5, wherein:
the sideband transmit circuit transmits the second sideband data along the first link concurrently with the receiver circuit receiving the first sideband data along the first link.

7. The IC chip of claim 1, wherein:
the receiver circuit receives solely sideband data without an accompanying clock from the sideband sub-interface via the converter circuit.

8. The IC chip of claim 1, wherein:
the first sideband data is received as return-to-zero (RZ) data.

9. A chiplet-based multi-chip module (MCM), comprising:
a first integrated circuit (IC) chiplet comprising
a first Universal Chiplet Interconnect express (UCIe) interface to transfer signals along a first number of signal paths in accordance with a UCIe protocol, the UCIe interface comprising
a mainband sub-interface for to transfer mainband signals, and
a sideband sub-interface to transfer sideband signals along a first number of sideband signal paths; and
a first converter interface to convert the first number of signal paths to a second number of signal paths that is less than the first number of signal paths; and
a second IC chiplet comprising
a second converter interface coupled to the first converter interface via a number of links that correspond to the second number of signal paths, the second converter interface comprising
a receiver circuit to receive first sideband data from the second converter interface, the receiver circuit comprising
local clock circuitry to generate a sampling signal;
oversampling circuitry to oversample the first sideband data in response to the sampling signal to generate oversampled data; and
majority detection circuitry to receive the oversampled data and to resolve states of bits of the first sideband data based on a majority voting process carried out by the majority detection circuitry.

10. The chiplet-based MCM of claim 9, further comprising:
a locked-loop circuit to generate the sampling signal based on a reference clock, the reference clock common to the first IC chiplet and the second IC chiplet.

11. The chiplet-based MCM of claim 9, further comprising:
a sideband transmit circuit to transmit solely second sideband data to the second IC chiplet via a first one of the number of links without an accompanying sideband clock.

12. The chiplet-based MCM of claim 11, wherein:
the sideband transmit circuit is configured to transmit the second sideband data along the first one of the number of links.

13. The chiplet-based MCM of claim 12, wherein:
the sideband transmit circuit transmits the second sideband data along the first one of the number of links concurrently with the receiver circuit receiving the first sideband data along the first one of the number of links.

14. The chiplet-based MCM of claim 9, wherein:
the receiver circuit receives solely sideband data without an accompanying clock via the second converter interface.

15. The chiplet-based MCM of claim 9, wherein:
the first sideband data is received as return-to-zero (RZ) data.

16. An interface conversion circuit, comprising:
conversion circuitry coupled to a Universal Chiplet Interconnect express (UCIe) interface, the conversion circuitry to receive first sideband data in accordance with a UCIe protocol from a second interface conversion circuit, the conversion circuitry comprising
a receiver circuit to receive the first sideband data from the second interface conversion circuit, from off-chip via a first link, the receiver circuit comprising
local clock circuitry to generate a sampling signal;
oversampling circuitry to oversample the first sideband data in response to receiving the sampling signal to generate oversampled data; and
majority detection circuitry to receive the oversampled data and to resolve states of bits of the first sideband data based on a majority voting process carried out by the majority detection circuitry.

17. The interface conversion circuit of claim 16, wherein:
the conversion circuitry comprises a micro-bump interface array; and
the second interface conversion circuit comprises a standard bump interface array.

18. The interface conversion circuit of claim 17, realized as a dynamic random access memory (DRAM) IC chip.

19. The interface conversion circuit of claim 17, realized as a logic IC chip.

* * * * *